Patented May 5, 1942

2,281,910

UNITED STATES PATENT OFFICE 2,281,910

FLUX

Jerome Milton Bialosky and Menahem Merlub-Sobel, Cleveland Heights, Ohio, assignors to William L. Ulmer, Cleveland, Ohio No Drawing. Application April 13, 1940, Serial No. 329,494

6 Claims. (Cl. 148—23)

This invention relates, as indicated, to improvements in fluxes adapted to be entrained in a gaseous medium supplied to heating, welding and brazing torches, and is a continuation-in-part of our co-pending patent application Serial No. 220,560, filed July 21, 1938.

Such fluxes or fluxing agents are preferably in liquid form and consequently reducible to vaporous, gaseous or mechanically finely-divided form, so that they may be entrained in a gas stream supplied to the torch.

Heretofore alkyl borates, or similar volatile organic boron compounds, either in the form of the compounds themselves, or in the form of their azeotropes with the corresponding alcohols, have been used for such "gas entrained" or "vapor phase" fluxing agents. Such borates react in the torch flame, or in the heating zone to produce boric oxide, which then, through its solvent action on oxides and similar substances, or by action in lowering surface tensions, enables the wetting of metal surfaces by other metal surfaces, and effects the chemical or mechanical elimination of oxides and contaminating impurities. For the most part, methyl borate has been used for this purpose because its relatively low boiling point, and the somewhat lower boiling point of its methyl alcohol azeotrope, have lent themselves particularly well to adequate entrainment in a gas stream.

Although theoretically excellent, the entrainment of methyl borate or its azeotrope has not proven itself satisfactory for commercial welding or brazing. This results from the fact that the combustible gas used cannot be completely dehydrated except by drastic chemical means outside the realms of practical operation. The moisture in such gas reacts with the methyl borate, hydrolizing it to free boric acid, which gradually clogs the various nozzles, passages and apertures of the torch. For this reason, and contrary to previous teaching in the art, we have found it necessary to dilute the methyl borate with methyl alcohol to a point far below its azeotrope. Thus, though the azeotrope represents only 28% alcohol, with the remaining 72% as methyl borate, it has proven extremely difficult to operate a welding torch for any length of time with less than 50% of methyl alcohol if no further additions are made. This, in turn, has led to other grave difficulties in operation of the torch. The high oxygen content of methyl alcohol (49.95%), together with its relatively low total heat of combustion, acts to chill the operating flame and thereby to nullify the value of the flux as well as to make torch operation generally difficult.

Methyl alcohol or methanol possesses a further disadvantage in that, due to its relatively great affinity for water or moisture, it becomes increasingly diluted during contact with the gas stream, with the result that the concentration of the borate becomes less and less until it is so weak as to be insufficient to produce the desired fluxing action.

Our invention consists of the means hereinafter fully described and particularly pointed out in the claims, the following description setting forth in detail certain means embodying the invention, such disclosed means constituting, however, but one of the various ways in which the principle of the invention may be used.

We have found that if, to methyl borate, the azeotrope, or to any similar mixture containing more than approximately 50% of the borate, there be added, as diluent, a physically and chemically compatible solvent containing substantially less than 50% oxygen, such as acetone, containing 27% oxygen, and boiling between 60° and 80° C., the resultant liquid will function with complete satisfaction as a gaseously entrainable flux to a welding, heating, or brazing torch.

In order for the relative composition to remain fairly constant, it is preferable that the dilution liquid have a boiling point between 50° and 60° C. when the azeotrope is used; for pure methyl borate, the 60°-80° C. range is preferable.

As one example of a preferred composition, to be used in a standard vapor-saturation tube, may be cited a liquid consisting of 44% of methanol-methyl borate azeotrope and 56% of acetone. In round figures, this gives a fluid comprising 1. 32% methyl borate.
2. 12% methanol.
3. 56% acetone.

This fluid, when subjected to a stream of acetylene, hydrogen, or similar combustible gas passing through it, using a standard vapor-saturation tube, will vaporize consistently, will leave no appreciable hydrolysis products in the saturation chamber or in the welding, heating or brazing equipment, will react in the flame to give a proper coating of boric acid or oxide on the work, and will function to maintain a uniform concentration of the active borate.

As another type of preferred composition may be cited a liquid containing 90% of the methanol-methyl borate azeotrope, with 10% of acetone.

Such a mixture is best used with the specialized flux-entrainment device described by our co-worker, Charles A. Medsker in his co-pending application Serial No. 261,559, filed March 13, 1939, which issued December 3, 1940, as U. S. Patent No. 2,223,456.

Of course it is in no way essential that the azeotrope-forming alcohol be present. The same effect can be obtained by using a solvent of the type indicated with methyl borate alone, and our invention is to be so understood. We have found that the methanol content, whether the methyl borate is in a pure form or in the form of the azeotrope, is best held in the range of 4% to approximately 50%. The maximum range may, however, be from 0% up to about 50%. The practical factor of ease of manufacture of the azeotrope as compared with pure methyl borate is, however, of commercial importance, and it is for this reason that we prefer diluents with normal boiling points below 70° C., and particularly in the 50°-60° C. range.

An indication of diluents which are practical for this purpose, and which are to be included in our invention, may be listed ethers such as isopropyl ether, ketones such as acetone and methyl ethyl ketone, and esters such as ethyl formate, methyl acetate, and ethyl acetate. Amines are undesirable because of their reactivity with the methyl borate. The aldehydes are also undesirable because of their reactivity with the methanol of the azeotrope. Amines and aldehydes are obviously therefore not "physically and chemically compatible" solvents, and are not to be considered as subjects of this invention.

We have found that a content of less than 15% of methyl borate by volume is inadequate for the protection necessary in a fluxed flame, and this 15% therefore represents the minimum methyl borate content of our invention. While we have not fully ascertained the maximum methyl borate content which may be used, we have used up to about 80% of the borate with satisfactory results. The diluents of this invention, boiling under normal pressure substantially between 50°-80° C., must be in volume proportion of no less than 5%, and 5% is therefore the minimum content of such diluent or diluents. The maximum diluent content may be 80%.

All of the percentages which have herein been given are by volume.

Other modes of applying the principle of our invention may be employed instead of the one explained, change being made as regards the compositions herein disclosed, provided the ingredients stated by any of the following claims or the equivalent of such stated ingredients be employed.

We therefore particularly point out and distinctly claim as our invention:

1. A liquid for entrainment by gas to be delivered to a torch containing from 15% to 80% methyl borate, with the remainder one or more liquids which are physically and chemically compatible with said borate, said last-named liquid or liquids selected from the group consisting of ethers, ketones and esters and containing substantially less than 50% oxygen.

2. A liquid for entrainment by gas to be delivered to a torch, containing more than about 15% methyl borate, methanol in a maximum quantity equivalent to that present in methanol-methyl borate azeotrope, and the balance acetone.

3. A liquid for entrainment by gas to be delivered to a torch containing from 15% to 80% methyl borate and the balance acetone.

4. A liquid for entrainment by gas to be delivered to a torch containing from 15% to 80% methyl borate and the balance isopropyl ether.

5. A liquid for entrainment by gas to be delivered to a torch containing from 15% to 80% methyl borate and the balance ethyl formate.

6. A liquid for entrainment by gas to be delivered to a torch, said liquid consisting of from about 15% to about 80% methyl borate, from about 4% to about 50% methanol, with the remainder one or more liquids which are physically and chemically compatible with said borate, said last-named liquid or liquids selected from the group consisting of ethers, ketones and esters and containing substantially less than 50% oxygen.

JEROME MILTON BIALOSKY.
MENAHEM MERLUB-SOBEL.